United States Patent [19]

Bennett

[11] 4,080,957
[45] Mar. 28, 1978

[54] SOLAR PANEL

[76] Inventor: Christopher John Bennett, Little Stratton, Moor Hall Lane, Danbury, Essex CM3 4ER, England

[21] Appl. No.: 650,397

[22] Filed: Jan. 19, 1976

[30] Foreign Application Priority Data

Jan. 20, 1975 United Kingdom ............... 2404/75

[51] Int. Cl.² ............................................. F24J 3/02
[52] U.S. Cl. .................... 126/271; 237/1 A; 165/105
[58] Field of Search ............... 126/270, 271; 237/1 A; 165/105

[56] References Cited

U.S. PATENT DOCUMENTS

| | | | |
|---|---|---|---|
| 1,250,260 | 12/1917 | Wilcox | 126/271 |
| 3,227,153 | 1/1966 | Godel et al. | 126/271 |
| 3,390,672 | 7/1968 | Snelling | 126/271 |
| 3,637,007 | 1/1972 | Shlosinger | 165/105 |
| 3,799,144 | 3/1974 | Ramsey et al. | 126/270 |
| 3,875,926 | 4/1975 | Frank | 126/271 |
| 3,916,871 | 11/1975 | Estes et al. | 126/271 |
| 3,923,038 | 12/1975 | Cutchaw | 126/271 |
| 3,957,029 | 5/1976 | Nozik | 126/270 |

*Primary Examiner*—Kenneth W. Sprague
*Assistant Examiner*—James C. Yeung
*Attorney, Agent, or Firm*—Sughrue, Rothwell, Mion, Zinn and Macpeak

[57] ABSTRACT

The invention provides a method for heating water by solar radiation using a reflux condenser system in which a heat transfer liquid is boiled by solar radiation and the vapor used to heat the water in a heat exchanger. The solar panel itself is highly efficient in operation and comprises a solar plate which incorporates a number of tubes containing the heat transfer liquid, these elements being located within an evacuated enclosure. Vapor from the boiling liquid passes up these tubes into a jacket surrounding a pipe through which the water to be heated is passed; liquid condensing within the jacket passes back to the tubes in the solar plate under gravity. The system incorporating the tubes and the jacket is maintained at a low gas pressure so that boiling of the heat transfer liquid takes place whenever there is a temperature difference between the panel and the heat exchanger.

15 Claims, 3 Drawing Figures

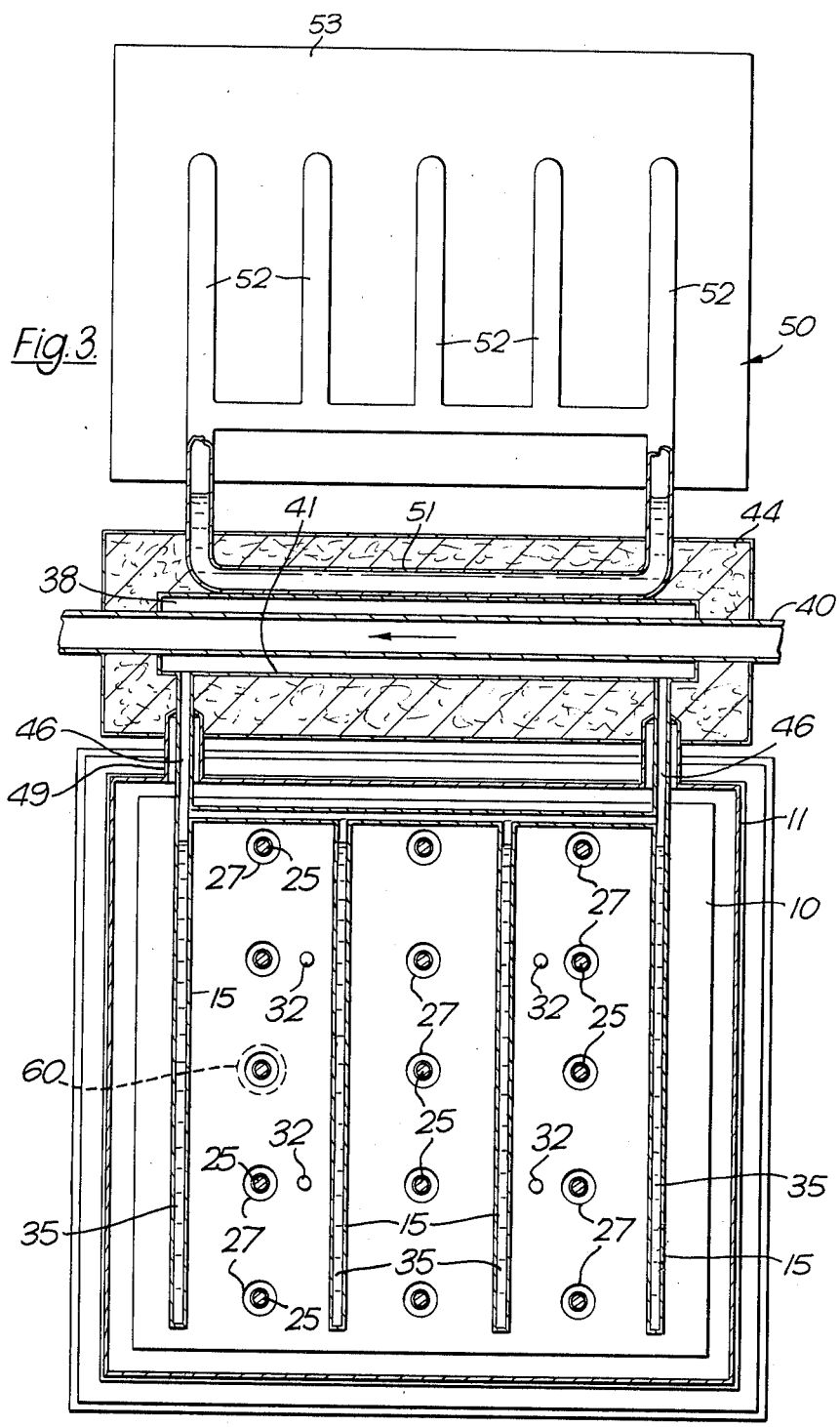

SOLAR PANEL

BACKGROUND OF THE INVENTION

This invention relates to solar panels adapted for utilising the heat produced by solar radiation.

In known solar panels, a flat plate blackened on the front to improve absorption of solar radiation is arranged with its blackened surface facing the sun and sloped at a suitable angle to optimize the energy collected. A series of tubes are secured to the panel, and water to be heated is circulated through these tubes to extract the heat received by the panel. The back of the panel is often insulated by a layer of insulating material such as glass wool or plastic foam.

In most cases these panels include a frontal screen made of glass or transparent plastics material such as transparent acrylic or PVC, which allows solar radiation to pass through the screen onto the panel and retains the heat by reducing losses caused by re-radiation or convection cooling.

The warmed water from solar panels is normally circulated through a separate tank, so that the temperature may build up to a maximum value being a balance between the heat input and heat losses in the system. This water is then used as feed water for the main hot water tank, as hot water is drawn off from the system. As this water is generally only warm, except in very hot weather or when the panel is used in hot climates, it cannot be used directly as hot water, and a separate heater in the main hot water tank is necessary to heat the water to usable temperatures. It is also clear that water from the solar panel cannot be used generally for maintaining the temperature of the hot water in the main tank.

Some larger installations utilise heat exchangers of varying complexity. The heated liquid circulating through the panel is passed in tubes through a tank, so that the heat is transferred into the water in this tank. This water may be used indirectly as described above or further "heat pumps" may be used to extract the heat from the water so that it can be used for heating water in the main hot water system of the installation.

A number of factors limit the efficiency of known panels. They are relatively useful for heating water in hot climates, but in general they only result in warm water in temperate climates, suitably only for swimming pools except in very hot weather. The flat black plate heated by the solar radiation also heats the air trapped between the solar plate and the front window, and some of this heat is lost by air convection and conduction through this window. Some heat is also lost through the back layer of insulating material.

Solar panels also suffer from cold and icy conditions, where the temperature is such that circulating water in the panel may freeze and burst the pipes. This can be overcome by draining the water from the panel in cold weather, but if an anti-freeze agent is used to prevent this occurring, then a heat exchanger must be used to extract the heat from this liquid.

As solar heat only falls during part of the day, and not at all at night, the panel is heated only at irregular intervals. Liquid circulating through the solar panel will gain heat during these intervals, but will lose heat at other times when the panel acts as a radiator. This is usually overcome in known panels by using a thermostatically operated switch, which controls the circulation so that it only occurs when the temperature exceeds a pre-set level, or is higher than the temperature of water in the storage tank.

In most known panels, water to be heated is passed into the panels at the bottom, travels up through the panels in the tubes and out at the top of the panel. In order to interconnect adjacent panels to increase the heating effect, the inlet pipes and the outlet pipes are connected respectively, but to ensure uniform heating effects and to maintain high panel efficiency, careful balancing of the water flow is necessary.

Other solar installations have been built, and various methods proposed for focusing the solar rays onto collectors in order to concentrate the energy received. In this way, higher temperatures are achieved and losses reduced, but only at the expense of complication and cost. The parabolic reflectors or focusing devices used must be steered to follow the direction of the sun, which requires expensive and complicated equipment.

It is an object of the present invention to eliminate or minimise the disadvantages of known solar panels by providing a method and apparatus for solar heating which is capable of providing water hot enough to feed straight into a main hot water tank, thus eliminating the need for a separate warm water tank. It is a further object of the invention to utilise a refluxing condenser system incorporating a liquid which will not freeze even in the coldest weather, so that the problem of bursting pipes is overcome. A further object of the invention is to reduce heat losses from the hot water during both hot and cold periods to very low values, and to provide a design of panel in which the interconnection of adjacent panels is simplified and the requirement for flow equilization controls is eliminated. Furring up of the narrow channels in the panel will not occur, and corrosion of these channels is eliminated.

A still further object of the invention is to provide means for concentrating the heat without the use of optical focusing.

SUMMARY

According to the present invention, there is provided a method of heating a fluid using solar energy, comprising raising the temperature of a heat transfer liquid to its boiling point by causing the liquid to pass in heat exchange relationship with a solar plate having a solar radiation-receiving surface, causing the vapour from the boiling liquid to pass in heat exchange relationship with the fluid to be heated, and returning the liquid condensed from the vapour to the solar plate for further heat transfer duty.

The fluid, which is generally water but which may be any suitable gas or liquid, is thus heated in a refluxing condenser system which uses solar energy as a heat source. As will be described, this has many advantages over conventional arrangements.

Suitably the heat transfer liquid and vapour is contained within a sealed system which includes passages associated with the solar plate, in which the heat transfer liquid boils. This system also includes one side of an indirect heat exchanger through which the heat transfer vapour is passed in heat exchange relationship with the water to be heated. Preferably at ambient temperature the sealed system is maintained at less than ambient pressure, so that boiling of the heat transfer liquid, and therefore heat transfer, will take place whenever the temperature of the solar plate rises above the temperature in the heat exchanger.

The heat exchanger is suitably located at a higher level than the passage means, and the liquid condensed from the vapour passes back to the solar plate under gravity.

Suitable liquids for the heat transfer liquid include toluene, n-butyl alcohol and methanol.

The invention also includes apparatus for heating a fluid by means of solar energy, comprising a solar plate having a surface adapted to receive solar radiation, one or more passage means associated with said solar plate, an indirect heat exchanger having a first part through which the fluid to be heated can pass, and a second part connected to said passage means, and a heat transfer liquid in said passage means, the arrangement being such that heating of said surface by solar radiation causes the heat transfer liquid within the passage means to boil, and vapour from this boiling liquid passes to the heat exchanger where it passes in heat exchange relationship with the fluid to be heated, at least the second part of said heat exchanger being located at a higher level than said passage means to enable heat transfer liquid condensing in said second part of the heat exchanger to return to said passage means under gravity.

Suitably the radiation-receiving surface of the solar plate is black in colour or is processed to give a selective filter action in order to absorb as much solar radiation as possible. The passage means can comprise a plurality of tubes either in the solar plate or bonded or otherwise secured to one face of the solar plate, and advantageously the first part of the indirect heat exchanger comprises a generally horizontal conduit through which water to be heated by the panel is passed, and the second part comprises an annular enclosure defined by an outer jacket surrounding the conduit and connected to the tubes fitted to the face of the solar plate. These tubes, and the enclosure defined by the outer jacket, can thus form a sealed system containing the heat transfer liquid and any vapour. Preferably the gas pressure in this system is reduced to a low value so that the heat transfer liquid boils and the vapour condenses whenever the panel is hotter than the water passing through the horizontal conduit. The heat transfer liquid is such that it does not freeze until a very low temperature is reached, lower than any temperature to be experienced by the panel.

When solar energy falls on the solar plate, the temperature of the heat transfer liquid rises and it begins to boil. The vapour passes up through the tubes on the face of the solar plate into the horizontal heating jacket and condenses on the wall of the conduit carrying the water to be heated, thereby transferring the heat to this water. Thus heat from the solar panel is transferred and the water is heated towards the temperature of the boiling liquid in the panel. When the solar energy falling on the plate decreases and the temperature of the plate falls below that of the water in the horizontal pipe, the heat transfer liquid ceases to boil and heat transfer ceases, and the heating jacket around the water pipe then acts as an insulating jacket. The reduced pressure in the enclosure improves the insulating properties of the jacket. Suitably, this jacket is surrounded with thick lagging to further reduce heat losses.

Adjacent panels may be interconnected directly by coupling the horizontal water pipes at the top of each panel together. If necesssary, these horizontal water pipes may form part of a conventional heating system, such as a system for water heating or a central house heating system. Examples of suitable heat transfer liquids are toluene, n-butyl alcohol or methanol, which have suitable vapour pressures, boil at suitable temperatures, and will not freeze even under the coldest conditions.

In a preferred construction, at least the solar plate and the passage means are located within an evacuated or reduced pressure enclosure in order to minimise heat losses from the panel during both hot and cold periods; this enclosure comprises a pair of spaced, parallel and substantially rigid sheets, at least one of which is transparent or has a transparent portion, hermetically sealed around their edges with a metal foil seal, and a plurality of spacer elements located between the sheets. These spacer elements maintain a minimum spacing of the sheets, and each spacer element is freely located between the sheets to allow relative expansion movements thereof, but is designed such that the atmospheric pressure on the two sheets causes them to return to an equilibrium position.

Each of these spacer elements are suitably formed at one end with a cylindrical shank and at the other end with a portion forming an enlarged end which is provided with a spherical bearing surface. Where the front sheet is of glass or transparent plastics material, and the rear sheet is metal, the cylindrical shank of each spacer is received in the central recess of a counterbored washer located on the inside surface of the front sheet, while the enlarged spherical surface of the other end of the spacer contacts the inside surface of the rear sheet directly.

In the case where both sheets are of glass or transparent plastics material, the cylindrical shank of each is received in the central recess of a counterbored washer located on the inside surface of one of the sheets, while the enlarged spherical surface of the other end of the spacer contacts a bearing plate located on the inside surface of the other sheet.

Preferably, the spacer elements are formed from steel and the washers from copper, or aluminium or any suitable alloy.

The solar plate is located between the sheets, preferably not in direct contact with either, and the spacer elements pass through openings formed in the solar plate without touching the plate so that no heat is lost by conduction to the front and rear sheets of the evacuated enclosure.

The solar plate itself is advantageously located in the evacuated enclosure by a number of pegs, suitably made from a material which is a poor heat conductor, such as a plastics material, and which are fixed in bores formed in the solar plate.

The hot water conduit with the heat exchanger jacket may be either within or outside the evacuated enclosure.

In a preferred embodiment of the invention, radiator means are associated with the heat exchanger operable to prevent overheating of the apparatus when the temperature of the heat exchanger exceeds a predetermined level. These radiator means preferably comprise a radiator panel which includes a tube system communicating with a passageway associated with the heat exchanger, and a second heat transfer liquid located in the passageway, the arrangement being such that a rise in temperature in the heat exchanger beyond a predetermined level causes the second heat transfer liquid within the passageway to boil, and vapour from this boiling liquid passes to the tube system of the radiator panel. The radiator panel is located at a higher level than the passageway associated with the heat exchanger so that the liquid condensing in the tube system runs back into the passageway under gravity.

The radiator means thus operates on the same refluxing condenser system as the solar panel of the apparatus, and acts to prevent the apparatus from rising in temperature above a pre-set limit. This is an important addition to a vacuum insulated panel, which is so efficient that overheating can easily occur with consequent damage to the parts such as the selective filter coating or the vacuum seals.

BRIEF DESCRIPTION OF THE DRAWINGS

FIG. 3 shows a diagrammatic vertical sectional view of a similar panel which includes a radiator device for preventing overheating.

DESCRIPTION OF THE PREFERRED EMBODIMENTS

Figure 1:
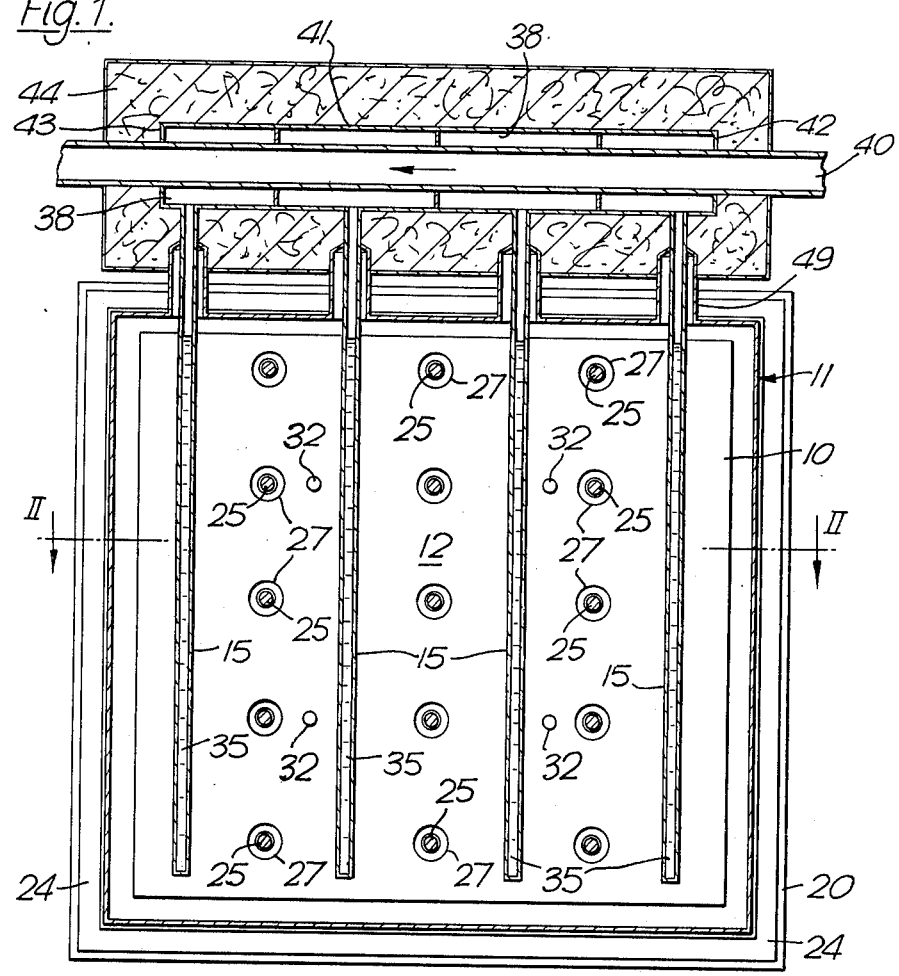
FIG. 1 shows a diagrammatic vertical sectional view of a panel for use in heating water by means of solar energy.
Figure 2:
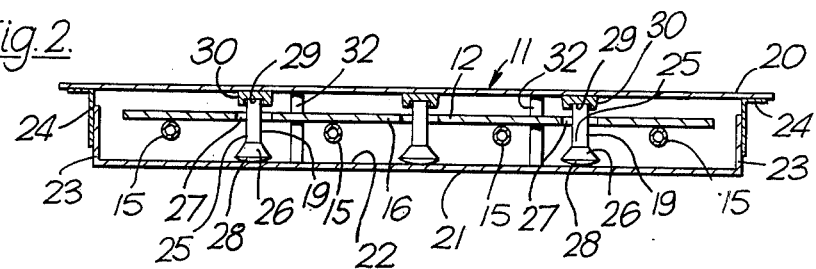
FIG. 2 shows a diagrammatic horizontal sectional view of the panel shown in FIG. 1 taken along the line II—II in FIG. 1.

Referring to the drawings, FIGS. 1 and 2 show a panel for use in heating water by means of solar energy, comprising a solar plate 10 having a solar radiation-receiving surface 12 located within an evacuated enclosure 11. The solar plate 10 consists of a flat metal sheet of for example 2 or 3 mm thick aluminium or steel, the front surface 12 of which is blackened or otherwise treated to improve absorption of solar energy. To the back of this plate are bonded or otherwise secured passageways in the form of tubes 15 of for example 4 to 6 mm internal diameter which are aligned vertically and spaced typically 15 to 20 cm apart. The overall size of the solar plate depends upon the requirements of the installations, but a typical installation for heating water in a private house would be 0.5 to 1.0 meters wide and up to 2 meters high. In this latitude, the panel would be sloped at an elevation of 35° to 40° to the ground surface.

The solar plate 10 is preferably provided with a reflective rear surface 16 in order to reduce heat losses to the rear of the panel.

The evacuated enclosure comprises a front sheet 20 of rigid transparent material such as glass or plastics and a back plate 21 of a metal such as steel or aluminium, although the back plate may also be of the same transparent material as the front plate if desired. The inside surface 22 of this back plate 21 is also made reflective to reduce heat losses, e.g. where the back plate is glass, this would be silvered. Vacuum walls 23 extend round from the back plate 21, and the front sheet 20 is bonded to these vacuum walls by a vacuum seal 24 which incorporates a flexible member adapted to take up relative expansion of the sheets due to any temperature changes. Such a seal is made of copper or aluminium foil suitably shaped, and these parts of the vacuum enclosure 11 are suitably constructed in accordance with conventional vacuum practice. In accordance with the invention, the front glass sheet 20 is spaced from the back plate using spacers 19 which pass with a clearance through holes 27 in the solar plate. As will be seen from FIG. 2, these spacer elements are formed with a cylindrical shank 25 and an enlarged frustoconical head portion 26 having a spherical bearing surface 28. The cylindrical shank of each spacer is received in the central recess 29 of a counterbored washer 30 which is located on the inside surface of the front sheet 20. The spherical bearing surface 28 contacts the metal backing plate 21 directly.

The spacer elements are formed from a material such as steel, and the washers 30 are made of a softer material such as copper or aluminium. The shanks are freely movable in the recesses 29 and the spacers are retained in position by the air pressure acting on the front and back plates.

On relative expansion of the sheets, the spacers 19 pivot about the washers 30 and about their bearing faces 28, moving the panels slightly further apart as they do so. On cooling, the panels return to the equilibrium positions shown in FIG. 2.

The provision of these spacers allows the use of the thin metal foil seal 24 around the periphery of the panel. As will be seen from FIG. 1, the holes 27 in the plate 10 are sufficiently large to enable the shanks 25 to pass through with clearance even after expansion of the plate. This prevents any heat loss by conduction from the plate 10.

Where both front and rear sheets 20 and 21 are formed from glass or plastics material, then a small metal disc (shown in broken lines at 60 in FIG. 1) is necessary for the spherical surfaces 28.

The solar plate 10 is supported in the vacuum enclosure 11 on widely spaced pegs 32 of plastics material which are fitted tightly into holes formed in the plate; they are of a sufficient length to enable the solar plate to expand relative to the vacuum enclosure whilst maintaining the plate in position. The pegs are of plastics material, or other material which is a poor heat conductor, to minimise heat loss by conduction.

The water to be heated passes along a horizontal conduit 40, typically a 2.5 cm diameter copper tube, which is connected into the hot water system for the house. A heating jacket 41 surrounds this conduit and is sealed at its ends 42 and 43. Both the horizontal conduit 40 and its heating jacket 41 are heavily lagged in the area indicated at 44. The heating jacket 41 defines an enclosure 38 communicating with the tubes 15, and these tubes 15, which are shown bonded to the rear of the solar plate 10, contain a heat transfer liquid 35. This liquid fills only part of these tubes; the remainder of the tubes and the enclosure 38 is evacuated to a low gas pressure. The solar energy received by the solar plate 10 causes the liquid in the tubes 15 to heat up, and to boil. The vapour produced by this boiling liquid passes into the enclosure 38, where it condenses on the water conduit 40 and heats the water passing through this conduit. The condensed liquid is returned to the solar plate, for further recycling. The arrangement which results in this action of boiling and refluxing of liquid is known as a reflux condenser, and various configurations of pipes and heating jacket may be used. In one design shown in FIG. 1, the vertical tubes 15 bonded to the back of the solar plate 10 communicate individually with separate compartments in the interior of the heating jacket 41. When the liquid boils in the tubes 15, the vapour passes straight up into the heating jacket, where it condenses and runs back down the same tubes.

In an alternative arrangement shown in FIG. 3, boiling heat transfer liquid passes up the vertical tubes into a common horizontal tube, and vapour passes up the two tubes 46 at either end of the solar plate into the heating jacket. Condensed vapour also passes back into the solar plate through these two tubes at either end of the heating jacket 41. In this arrangement, if the heating jacket is not mounted exactly horizontally, liquid flowing to either end is immediately returned to the solar panel via the tubes 46. In both embodiments the tubes 15 and 46 are insulated at their upper ends by appropriate extensions of the vacuum enclosure at 49.

The conduit 40 and jacket 41 constitute an indirect heat exchanger in which the vapour from the heat transfer liquid 35 gives up heat to the water passing through the conduit 40. Due to the reduced gas pressure within the sealed system, the liquid and vapour in the system try to maintain an equilibrium condition, with the result that boiling of the liquid occurs whenever the temperature within the enclosure 38 falls below that of the solar plate.

Heat transfer therefore takes place whenever a temperature difference is present.

Other constructions of heat exchanger could also be used, such as adjacent, contacting pipes through which the water and vapour are passed. These pipes can be provided with fins to assist in heat transfer.

The heat transfer liquid used in the panel must be chemically stable so that it does not dissociate or decompose giving a gas which would increase the pressure and thus affect the boiling temperature.

Suitable liquids to be used for heat transfer are toluene, methanol or n-butyl alcohol which all freeze at temperatures much below any temperatures likely to be reached by the solar panel. As the gas pressure in the system is very low, the heating jacket acts as an evacuated insulating jacket for the circulating water when the solar panel is cold. Other liquids could also be used.

The pipe 40 carrying the water to be heated is preferably provided with some means to promote good heat transfer from the condensing vapour to the water. This may consist of a series of baffles to create turbulence in the water, or of fins to increase the area both for vapour condensation and for heat transfer into the water. The panels may be easily interconnected by placing them adjacent to each other and joining the pipes 40. The vacuum enclosure may be evacuated through a suitable aperture, and is preferably provided with chemical getters of any type known to those versed in the art of maintaining a good vacuum.

With a vacuum insulated panel constructed in accordance with the invention, the panel becomes so efficient that overheating can occur in some situations, with consequent damage to elements such as the selective filter coating on the glass or solar plate, or the vacuum seals.

This could take place for example if the flow of water through conduit 40 stops, due to mains or pump failure.

In order to prevent overheating in such an eventuality, the panel in FIG. 3 is provided with a radiator panel 50 adapted to remove heat from the jacket 41 if the temperature rises above a pre-set level.

This panel 50 is located above the conduit 40 and comprises a passageway 51 in good thermal contact with the jacket 41 and communicating with a series of vertical tubes 52 which are attached to or incorporated in a flat radiator plate 53. The tubes 52 may be convoluted if desired and the radiator plate 53 may be provided with cooling fins.

The passageway 51 incorporates a reflux liquid similar to the liquid 35 in the solar panel. The gas pressure in the tubes, and the liquid type, are chosen such that boiling of the liquid occurs at the required temperature suitable to prevent damage to the solar panel. The size of the plate 53 is also chosen to prevent a temperature rise above a certain level.

The boiling liquid causes vapour to pass up each tube 52, where it condenses in the panel; it then runs back down the tubes into the passageway 51 in a similar manner as the liquid 35.

Normally very little heat will be lost by conduction up the side tubes, but excess heat will be removed from the panel, and the temperature of the solar panel will be prevented from rising much above the boiling temperature of the reflux liquid in the radiator panel.

The temperature could be set at any required temperature, but is likely to be between 65° C and 95° C to prevent the water boiling, and would typically be about 80° C.

Other designs of solar panels will be apparent. For example, the solar plate 10 may be constructed with the tubes 15 bonded to its front face, or could be made by bonding two metal sheets together to produce a flat panel having substantially vertical channels similar to a wall radiator. The tubes could have horizontal portions or be sloped or shaped in a meandering pattern, though substantially so that the vapour can be formed in the panel and the condensed liquid be returned to the panel. The solar panel could be subdivided or split up, so that it has for example just one liquid heat transfer channel in each of separate compartments, but the vapour is passed to adjacent heat exchanger areas on a common hot water system. The heat exchanger could take any suitable form that allows heat transfer from the vapour into the water flowing through a separate passageway, but must allow the condensed liquid to return to the channels in the solar plate. For example, as stated, the water passageway and vapour condensing chamber could run adjacent to each other. Any liquid could be used in the panel so long as it has the necessary properties.

Both the solar panel 10 and the front and rear faces of the evacuated enclosure may be curved in order to optimise heat collection, and if required, the water tube 40 and its heating jacket may be located within the vacuum enclosure. Differently shaped spacers may be used so long as they allow rocking to occur which will return the vacuum enclosure to a stable equilibrium position, and the locating pegs for the solar plate may be shaped in any way that suitably maintains the solar plate so that it does not contact either the back or front sheets of the vacuum enclosure. The condensing vapour from the panel may be used for conducting heat to systems other than water, such as to a heat engine or to any other apparatus requiring heat, using an appropriate heat exchanger.

The vacuum enclosure is preferred for maximum efficiency, but the reflux condenser system will still operate if the solar panel is used at any pressure up to atmospheric pressure.

A panel constructed in accordance with the invention reduces heat loss from the hot water system in which it is used, eliminates the corrosion problems of aluminium panels and avoids the uneven flow characteristics caused by furring up of narrow-bore systems. The reduced pressure in the heating jacket improves insulation for the water tube in cold weather, and the vacuum in the panel protects any selective filter coatings from atmospheric deterioration. The high efficiency of the panel results in the provision of sufficient heat to produce hot water even under adverse conditions of cold or windy weather.

I claim:

1. Apparatus for use in heating a fluid by means of solar energy, comprising a solar plate having a surface adapted to receive solar radiation, one or more open passage means associated with said solar plate, said open passage means having a liquid zone containing a heat transfer liquid and a transfer zone located above said liquid zone, an indirect heat exchanger located at a higher level than said open passage means and having a first part through which fluid to be heated can pass, and a second part in fluid communication with the transfer zone of the open passage means and forming a sealed system with the passage means, the arrangement being such that heating of said surface by solar radiation causes the heat transfer liquid within the liquid zone to boil, and vapour from the boiling heat transfer liquid passes through said transfer zone of said open passage means to the heat exchanger where it passes in heat exchange relationship with the fluid to be heated, and heat transfer liquid condensing in said second part of the heat exchanger returns to the upper part of said liquid zone under gravity through said transfer zone of said open passage means.

2. Apparatus as claimed in claim 1, wherein said first part of the heat exchanger comprises a straight, horizontally disposed conduit to which the fluid to be heated is passed, and said second part of the heat exchanger comprises an enclosure defined by an outer jacket surrounding said conduit and connected to said passage means, said enclosure and said passage means together forming a sealed self-contained system containing the heat transfer liquid which system is, at ambient temperature, maintained at less than ambient pressure.

3. Apparatus as claimed in claim 1, wherein the front face of the solar plate is coated with a selective filter coating to reduce re-radiation of heat from the solar plate.

4. Apparatus as claimed in claim 3, wherein said radiator means comprise a radiator panel which includes a tube system communicating with a passageway associated with the heat exchanger, and a second heat transfer liquid located in the passageway, the arrangement being such that a rise in temperature in the heat exchanger beyond a predetermined level causes the second heat transfer liquid within the passageway to boil, and vapour from this boiling liquid passes to the tube system of the radiator panel, the radiator panel being located at a higher level than the passageway associated with the heat exchanger to enable liquid condensing in the tube system to run back into the passageway under gravity.

5. Apparatus as claimed in claim 1, including radiator means associated with the heat exchanger operable to prevent overheating of the apparatus when the temperature of the heat exchanger exceeds a predetermined level.

6. A method of heating a fluid using solar energy, in which a heat transfer liquid is contained within a sealed system which includes open passage means associated with a solar plate having a solar energy-receiving surface and one side of an indirect heat exchanger located at a higher level than said open passage means, said open passage means comprising a liquid zone containing the heat transfer liquid and a transfer zone communicating with said one side of the heat exchanger, the method comprising the steps of: raising the temperature of the heat transfer liquid in said liquid zone to its boiling point by heat transfer from said solar plate, causing the vapor from the boiling liquid to pass through said transfer zone to said one side of the heat exchanger, heating said fluid in said exchanger by indirect heat exchange relationship with the fluid to be heated, and returning liquid condensing from the vapour in said heat exchanger under gravity to the upper part of said liquid zone through said transfer zone of said open passage means.

7. A method as claimed in claim 6, wherein at ambient temperature, the sealed system is maintained at less than ambient pressure, and boiling of said heat transfer liquid takes place whenever the temperature of the solar plate rises above that in the heat exchanger.

8. A method as claimed in claim 6, wherein the heat transfer liquid is toluene, n-butyl alcohol, or methanol.

9. Apparatus for use in heating a fluid by means of solar energy, comprising a solar plate having a surface adapted to receive solar radiation, one or more passage means associated with said solar plate, said passage means including a liquid zone containing a heat transfer liquid and a transfer zone located above said liquid zone, an indirect heat exchanger located at a higher level than said passage means and having a first part through which fluid to be heated can pass, and a second part communicating with the transfer zone of the passage means and forming a sealed system with the passage means, the arrangement being such that heating of said surface by solar radiation causes the heat transfer liquid within the liquid zone to boil, and vapour from this boiling liquid passes through said transfer zone to the heat exchanger where it passes in heat exchange relationship with the fluid to be heated, and heat transfer liquid condensing in said second part of the heat exchanger returns to the upper part of said liquid zone under gravity via said transfer zone, said apparatus further including walls defining a hermetically sealed enclosure which is evacuated or maintained at a reduced pressure in which at least the solar plate and the passage means are located, said enclosure having front and rear walls comprising a pair of spaced, parallel and rigid sheets at least one of which is substantially transparent, metal foil sealing strips extending around the edges of said sheets to hermetically seal the space defined between said sheets, and spacer elements located between said sheets to maintain said sheets at a minimum spacing, each of said spacer elements being formed at one end with a cylindrical shank and at the other end with an enlarged spherical surface and being freely located between the sheets and adapted to rock from an equilibrium position on relative movement of said sheets due to thermal expansion.

10. Apparatus as claimed in claim 9, wherein said front sheet is of glass or transparent plastics material and said rear sheet is metal, and the cylindrical shank of each spacer is received in the central recess of a counterbored washer located on the inside surface of said front sheet, while the enlarged spherical surface of the other end of the spacer contacts the inside surface of said rear sheet directly.

11. Apparatus as claimed in calim 10, wherein said spacer elements are formed from steel and said washers from copper, aluminium or an aluminium alloy.

12. Apparatus as claimed in claim 9, wherein both said front and rear sheets are of glass or transparent plastics material and the cylindrical shank of each spacer is received in the central recess of a counterbored washer located on the inside surface of one of said sheets, while the enlarged spherical surface of the other end of the spacer contacts a bearing plate located on the inside surface of the other said sheet.

13. Apparatus as claimed in claim 12, wherein said spacer elements are formed from steel and said washers from aluminium or an aluminium alloy.

14. Apparatus as claimed in claim 9, wherein said solar plate and said passage means carrying the heat transfer liquid are located between the sheets out of direct contact therewith to prevent heat loss by conduction, said plate being mounted on pegs of plastics material received in bores formed in said solar plate.

15. Apparatus as claimed in claim 9, wherein the or each sheet of transparent material forming a wall of the evacuated enclosure is coated with a selective filter coating adapted to reduce re-radiation of heat from the solar panel.

* * * * *